Sept. 14, 1965   J. S. FISHMAN   3,205,928
SOLID RUBBER TIRE CONSTRUCTION
Filed Jan. 14, 1963
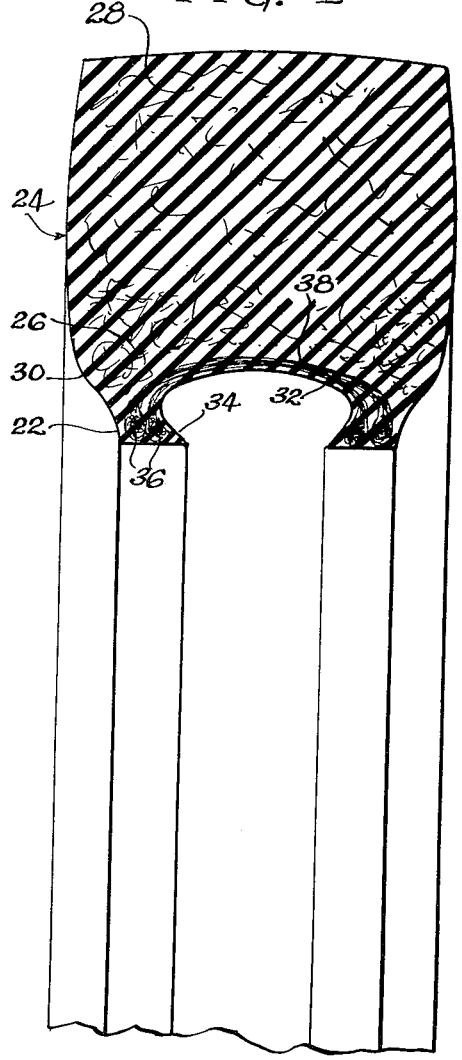
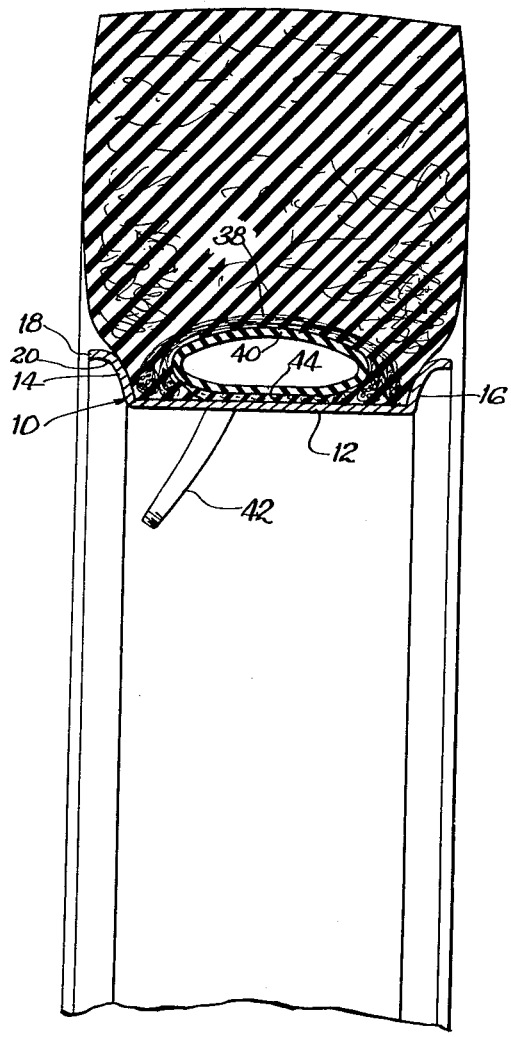
INVENTOR.
Jordan S. Fishman
BY Ooms, McDougall and Hersh
Att'ys United States Patent Office 3,205,928
Patented Sept. 14, 1965

3,205,928
SOLID RUBBER TIRE CONSTRUCTION
Jordan S. Fishman, Chicago, Ill., assignor to Louis Fishman & Co., Inc., Chicago, Ill., a corporation of Illinois
Filed Jan. 14, 1963, Ser. No. 251,353
6 Claims. (Cl. 152—166)

This invention relates to a solid rubber tire adapted removably to be mounted on a wheel rim and it relates more particularly to the construction and use of the solid tire whereby a desired gripping relationship can be established for holding the tire in position of use when mounted on the rim.

Solid rubber tires find continued use in wheeled vehicles such as are used in the construction industry and on mobile units adapted to receive or carry heavy loads. Such solid tires have the ability more effectively and more safely to accept such loads without deformations characteristic of pneumatic tires and without the high rate of wear characteristic of pneumatic tires. As a result, such solid rubber tires are more economical in use over the long run, not only by reason of their longer life but also by reason of the lesser costs and time expended for maintenance, repair and replacement.

To the present, solid rubber tires are fabricated with an inner diameter dimensioned to be slightly less than the diameter of the wheel rim and with a thickness at the base which is slightly greater than the crosswise dimension between the rim flanges. For mounting the tire onto the wheel rim, it becomes necessary forcibly to displace the tire of smaller diameter onto the rim of larger diameter so that a firm gripping relationship can be established to hold the tire on the rim. Such displacement for mounting and dismounting the tire requires power operated presses which limits the locations where such interchange can be made and prevents interchange of tires in the field.

It is an object of this invention to produce and to provide a method for producing solid tires that can be mounted or dismounted onto a rim without the necessity to make use of special presses or means to force the tire onto or off of the rim; which is resiliently held onto the wheel rim by means of a gripping relationship established at the base of the tire and the rim flanges; which can make use of a tire dimensioned to have a diameter and width substantially corresponding to the dimensions of the wheel rim; which can be mounted or dismounted easily and quickly without the need of highly skilled labor, and which still retains all of the desirable features and characteristics of a solid rubber tire in use.

These and other objects and advantages of this invention will hereinafter appear and for purposes of illustration, but not of limitation, an embodiment of the invention is shown in the accompanying drawing, in which—

FIG. 1 is a cross-sectional view of a solid rubber tire embodying the features of this invention; and FIG. 2 is a cross-sectional view of the tire of FIG. 1 shown in mounted relationship on the wheel rim.

Briefly described, the rubber tire assembly of this invention is adapted replaceably to be mounted on a wheeled vehicle wherein the wheel is of conventional construction insofar as the axle, the hub and the cylindrical rim are concerned and on which the rubber tire of this invention is adapted replaceably to be mounted.

Illustrated in the drawing is a portion of the rim 10 comprising a cylindrical member formed of a relatively flat base 12 and substantially radially extending laterally spaced apart annular side flanges 14 and 16 each of which is formed with an annular skirt 18 or lip extending laterally from the outer peripheral edges of the annular flanges to provide a curvilinear lead-in portion 20 for receipt of the bead 22 at the base of the tire 24. One of the flanges 14 or 16 may be removably secured on the rim to facilitate lateral displacement of the tire onto or off of the rim. Such mounting means is of conventional construction.

The tire 24 is of the type referred to in the trade as a solid rubber tire in that substantially the entire cross-section is solid, as distinguished from a pneumatic tire. The solid portion of the rubber tire is formed entirely of a conventionally filled or unfilled elastomeric composition such as natural rubber or synthetic rubbers or mixtures thereof, with or without carbon black or other pigments or fillers, and with or without fibrous reinforcement, as in the construction described in application Ser. No. 103,594, filed April 17, 1961, now U.S. Patent No. 3,066,716, issued December 4, 1962, wherein the matrix of elastomeric material is fabricated with fibers such as glass, cotton, rayon or nylon, dimensioned to have a length within the range of ½ to 8 inches and distributed in concentrations which may range from 0 to 50 percent fiber throughout the cross-section. The latter is preferably formed with the fiber concentration up to 50 percent in the inner portions 26 of the tire and with lesser amounts of fiber such as only up to 20 percent in the tread portion 28. The tire is molded under heat and pressure to advance the elastomeric material to the cured stage or vulcanized state in its final form for use.

The tire of this invention is formed with an outer peripheral portion which includes the major cross-section of the tire of the solid elastomeric composition and is dimensioned to have a width that is greater than the base portion 22 the latter of which is dimensioned to have a width corresponding to the distance between the rim flanges 14 and 16 so that the base portion will be received in fitting relationship between the flanges. The edge between the base portion of small dimension and the remainder of larger dimension is formed with a curvilinear portion 30 which is adapted somewhat to correspond with the curvature in the corresponding portion of the flange. The inner peripheral diameter of the tire is adapted to correspond to the outer diameter of the rim whereby the tire can be easily slipped sideways onto or off of the rim.

The inner peripheral portion of the tire is formed with an annular recess 32 of curvilinear shape which extends inwardly from the inner peripheral surface. The recess is preferably in the form of an oblong in cross-section having its major axis extending in the crosswise direction and its minor axis in the radial direction with the major axis being located a short distance outwardly from the inner periphery of the tire so as to provide a return portion 34 in the peripheral portion of the tire immediately adjacent to said opening.

Embedded within the elastomeric composition alongside the major axis of the opening and preferably slightly below the major axis are one or more strands or bundles 36 of metal wires or bands which extend continuously as rings about each side wall portion at the base of the tire to define the beaded portion thereof. The strands or bundles are preferably formed of metal wires but may instead comprise other high strength and dimensionally stable fibers or cords such as nylon, rayon or glass fibers.

The circumferentially extending bundle or bead on one side of the tire base is connected to the corresponding bundle or bead on the underside of the base by crosswise extending fibers 38 which are embedded within the elastomeric material immediately surrounding the elliptical opening. The fibers 38 encircle the bundles or beads on the opposite sides of the opening and extend continuously crosswise through the elastomeric material substantially immediately surrounding the opening directly to connect the two annular bead systems preferably without a re-entrant portion therebetween.

The tire is adapted to be provided with an inflatable tube 40 of elastomeric material shaped to be received in fitting relationship within the opening 32 when inflated by gaseous or liquid material. The tube is provided with a conventional valve stem 42 communicating with the interior of the tube for the purpose of introduction or removal of air or other gaseous or liquid material under pressure.

A new and novel combination is believed to result from the arrangement of elements described in that responsive to the introduction of air or gaseous material under pressure while the tube and tire are mounted on the rim, the tube will have a tendency to expand the adjacent portions of the rubber tire to enlarge the opening. However, the crosswise extending fibers 38 surrounding the opening and anchored at their ends to the annular wire beads 36 will have a resultant effect responsive to the packing of the solid tire to resist annular displacement but will instead transmit such force equally lengthwise through the lengths of the fibers to the annular beads 36 to cause the latter to be drawn upwardly and outwardly in an arc having the center of the crosswise fiber system as the pivot. This is because the fibers stretch in a direction which extends outwardly and downwardly to the bands to transmit such pulling forces as are imposed by the tube into outwardly and upwardly rocking forces of the connected bands to force the beaded base portion of the tire outwardly and upwardly into gripping relationship with the interior surface of the confining rim flanges.

This lateral displacement of the bead portion at the base of the tire is influenced further by the lateral pressures exerted by the inflatable tube on the base portion of the tire that partially surrounds the lateral portions of the tube.

The combination of forces, limited by the fibers to the desired lateral displacement of the base portions of the tire into gripping relationship with the wheel rims, operates securely to hold the tire onto the rim. The relatively small depth of the tube receiving opening 32 coupled with the much greater cross-section of the solid tire militates against deformation of the solid outer portion of the tire which includes the tread portion whereby the use and effect is still that of a solid tire but which embodies the combination of pneumatic and fiber means to maintain a mounted relationship.

While not equivalent, use can be made of a construction wherein the recess 32 is substantially circular in cross-section, it being understood that the fibers 38 and the large mass of elastomeric material making up the solid tire portion will substantially resist radial deformation of the recess and will thus limit deformation of the lateral direction responsive to pressure from the pneumatic tube.

When it is desired to dismount the tire, the tube can be deflated to relax the fibers and to permit the base portion to release the rim flanges.

It will be understood that the rim may include a saddle 44 of elastomeric material for disposition between the tube and the rim with lateral edge portions of the saddle extending into the opening for disposition between the tube and the adjacent lateral base portions of the surrounding tire to protect the tube from the rim and to enhance the sealing relationship.

It will be understood that changes may be made in the details of construction, arrangement and operation, without departing from the spirit of the invention, especially as defined in the following claims.

I claim:
1. The combination of a wheel rim and a solid tire adapted replaceably to be mounted on said wheel rim, said wheel rim being formed with a relatively flat cylindrical base and tire gripping flanges extending radially outwardly from the lateral edge portions of the base, said solid rubber tire having an inner base portion dimensioned to have a width corresponding to the width of the base portion between the tire gripping flanges and defining an opening having a diameter corresponding to the base portion of the wheel rim and defining narrow bead portions in the lateral edge portions of said inner base portion, said tire being formed with an outer main body portion of greater width than said inner base portion and being solidly formed of a cured elastomeric composition, an annular recess contiguous with the inner peripheral base portion of the tire and extending a short distance into the tire with reference to the overall cross-section of the tire with the major axis of the recess being spaced inwardly from the inner periphery of the tire, high strength reinforcing members extending continuously circumferentially about the tire in the bead portions thereof, high strength reinforcing fibers embedded in the elastomeric material adjacent the recess and extending continuously all around the tire from about the circumferential reinforcing members in one bead portion to the circumferential reinforcing members in the bead portion on the opposite side of the tire, said reinforcing members and the reinforcing fibers surrounding the members extending substantially completely across the width of each of said bead portions, a separate inflatable tube received within the annular recess, and means for passage of fluid under pressure into and out of said tube.

2. The combination as claimed in claim 1 in which the recess in the base portion of the tire is of elliptical shape with the major axis in the crosswise direction.

3. The combination as claimed in claim 2 in which the major axis of the recess is spaced a short distance inwardly from the inner periphery of the tire.

4. The combination as claimed in claim 1 in which the circumferentially reinforcing members comprise metal wire members.

5. The combination as claimed in claim 1 in which the reinforcing fibers extending crosswise between the reinforcing members and about the recess comprise fibers selected from the group consisting of cotton, nylon, rayon and glass.

6. The combination as claimed in claim 1 in which the recess extends into the tire for a distance less than one-fifth of the radial cross-section of the tire.

References Cited by the Examiner

UNITED STATES PATENTS

| | | | |
|---|---|---|---|
| 962,897 | 6/10 | Hartridge | 152—155 X |
| 1,311,163 | 7/19 | Gilmore et al. | 152—327 |
| 1,417,008 | 5/22 | Williams | 152—328 X |
| 1,461,766 | 7/23 | Wiegand | 152—327 |
| 1,492,231 | 4/24 | Warth | 152—155 |
| 3,034,553 | 5/62 | Barassi | 152—176 |
| 3,066,716 | 12/62 | Fishman | 152—323 |
| 3,095,917 | 7/63 | Arsandaux | 152—155 |

ARTHUR L. LA POINT, *Primary Examiner.*